US008330644B2

(12) United States Patent
Hilliard et al.

(10) Patent No.: US 8,330,644 B2
(45) Date of Patent: Dec. 11, 2012

(54) EXPANDABLE AND RECONFIGURABLE INSTRUMENT NODE ARRAYS

(75) Inventors: Lawrence M. Hilliard, Greenbelt, MD (US); Manohar Deshpande, Odenton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 341 days.

(21) Appl. No.: 12/835,958

(22) Filed: Jul. 14, 2010

(65) Prior Publication Data

US 2012/0013498 A1    Jan. 19, 2012

(51) Int. Cl.
*G01S 13/00* (2006.01)
*H03L 7/06* (2006.01)
(52) U.S. Cl. ............ 342/59; 342/70; 342/175; 342/179; 327/156
(58) Field of Classification Search ................ 342/26 R, 342/26 A, 26 B, 26 C, 26 D, 59, 70–72, 175, 342/179; 327/156
See application file for complete search history.

(56) References Cited

U.S. PATENT DOCUMENTS

| | | | | |
|---|---|---|---|---|
| 5,317,320 A | * | 5/1994 | Grover et al. | 342/159 |
| 5,949,262 A | * | 9/1999 | Dreps et al. | 327/156 |
| 7,221,308 B2 | * | 5/2007 | Burton et al. | 342/42 |
| 7,230,497 B1 | * | 6/2007 | Leonard | 331/16 |
| 7,898,344 B2 | * | 3/2011 | Hongo | 331/17 |
| 8,204,143 B2 | * | 6/2012 | Ravid et al. | 375/267 |
| 2002/0180498 A1 | * | 12/2002 | O'Leary et al. | 327/156 |
| 2006/0012476 A1 | * | 1/2006 | Markhovsky et al. | 340/539.32 |
| 2007/0194819 A1 | * | 8/2007 | Krasser et al. | 327/156 |
| 2008/0061891 A1 | * | 3/2008 | Hongo | 331/17 |
| 2009/0047913 A1 | * | 2/2009 | Kuru | 455/76 |
| 2009/0149202 A1 | * | 6/2009 | Hill et al. | 455/456.6 |
| 2009/0185650 A1 | * | 7/2009 | Ravid et al. | 375/376 |
| 2010/0156481 A1 | * | 6/2010 | Neumann | 327/156 |
| 2010/0165866 A1 | * | 7/2010 | Sachse et al. | 370/252 |
| 2010/0264961 A1 | * | 10/2010 | Onishi | 327/156 |
| 2011/0006942 A1 | * | 1/2011 | Kluge et al. | 342/125 |
| 2011/0248754 A1 | * | 10/2011 | Neumann | 327/156 |
| 2012/0007642 A1 | * | 1/2012 | Miyahara | 327/156 |
| 2012/0188125 A1 | * | 7/2012 | Pomietlasz | 342/357.68 |

OTHER PUBLICATIONS

"Development of Coherent, Expandable, Reconfigurable Instrument Node (ERIN) for Web Sensor Application", Hilliard L. M., Aerospace Conference IEEE 2008, Mar. 1-8, 2008, pp. 1-8.*

* cited by examiner

*Primary Examiner* — Jack W Keith
*Assistant Examiner* — Peter Bythrow

(57) ABSTRACT

An expandable and reconfigurable instrument node includes a feature detection means and a data processing portion in communication with the feature detection means, the data processing portion configured and disposed to process feature information. The instrument node further includes a phase locked loop (PLL) oscillator in communication with the data processing portion, the PLL oscillator configured and disposed to provide PLL information to the processing portion. The instrument node further includes a single tone transceiver and a pulse transceiver in communication with the PLL oscillator, the single tone transceiver configured and disposed to transmit or receive a single tone for phase correction of the PLL oscillator and the pulse transceiver configured and disposed to transmit and receive signals for phase correction of the PLL oscillator. The instrument node further includes a global positioning (GPA) receiver in communication with the processing portion, the GPS receiver configured and disposed to establish a global position of the instrument node.

20 Claims, 5 Drawing Sheets

EXPANDABLE AND RECONFIGURABLE INSTRUMENT NODE ARRAYS

BACKGROUND OF THE INVENTION

The subject matter disclosed herein relates to instrument node arrays, and more particularly, to expandable and reconfigurable instrument node arrays.

BRIEF DESCRIPTION OF THE INVENTION

According to an example embodiment of the present invention, an expandable and reconfigurable instrument node includes a feature detection means and a data processing portion in communication with the feature detection means, the data processing portion configured and disposed to process feature information. The instrument node further includes a phase locked loop (PLL) oscillator in communication with the data processing portion, the PLL oscillator configured and disposed to provide PLL information to the processing portion. The instrument node further includes a single tone transceiver and a pulse transceiver in communication with the PLL oscillator, the single tone transceiver configured and disposed to transmit or receive a single tone for phase correction of the PLL oscillator and the pulse transceiver configured and disposed to transmit and receive signals for phase correction of the PLL oscillator. The instrument node further includes a global positioning (GPA) receiver in communication with the processing portion, the GPS receiver configured and disposed to establish a global position of the instrument node.

According to an example embodiment of the present invention, an instrument node array may include a first instrument node and a second instrument node. Furthermore, the first and second instrument nodes may each include a feature detection means, a data processing portion in communication with the feature detection means, the data processing portion configured and disposed to process feature information, a phase locked loop (PLL) oscillator in communication with the data processing portion, the PLL oscillator configured and disposed to provide PLL information to the processing portion, a single tone transceiver in communication with the PLL oscillator, the single tone transceiver configured and disposed to transmit or receive a single tone for phase correction of the PLL oscillator, a pulse transceiver in communication with the PLL oscillator, the pulse transceiver configured and disposed to transmit and receive signals for phase correction of the PLL oscillator, and a global positioning (GPA) receiver in communication with the processing portion, the GPS receiver configured and disposed to establish a global position of the instrument node.

According to an example embodiment of the present invention, a mobile instrument node array may include a vehicle, a first instrument node arranged on the vehicle, and a second instrument node arranged on the vehicle separated from the first instrument node. The first instrument node is configured as a master node and the second instrument node is configured as a slave node. Furthermore, the first and second instrument nodes may each include a feature detection means, a data processing portion in communication with the feature detection means, the data processing portion configured and disposed to process feature information, a phase locked loop (PLL) oscillator in communication with the data processing portion, the PLL oscillator configured and disposed to provide PLL information to the processing portion, a single tone transceiver in communication with the PLL oscillator, the single tone transceiver configured and disposed to transmit or receive a single tone for phase correction of the PLL oscillator, a pulse transceiver in communication with the PLL oscillator, the pulse transceiver configured and disposed to transmit and receive signals for phase correction of the PLL oscillator, and a global positioning (GPA) receiver in communication with the processing portion, the GPS receiver configured and disposed to establish a global position of the instrument node.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
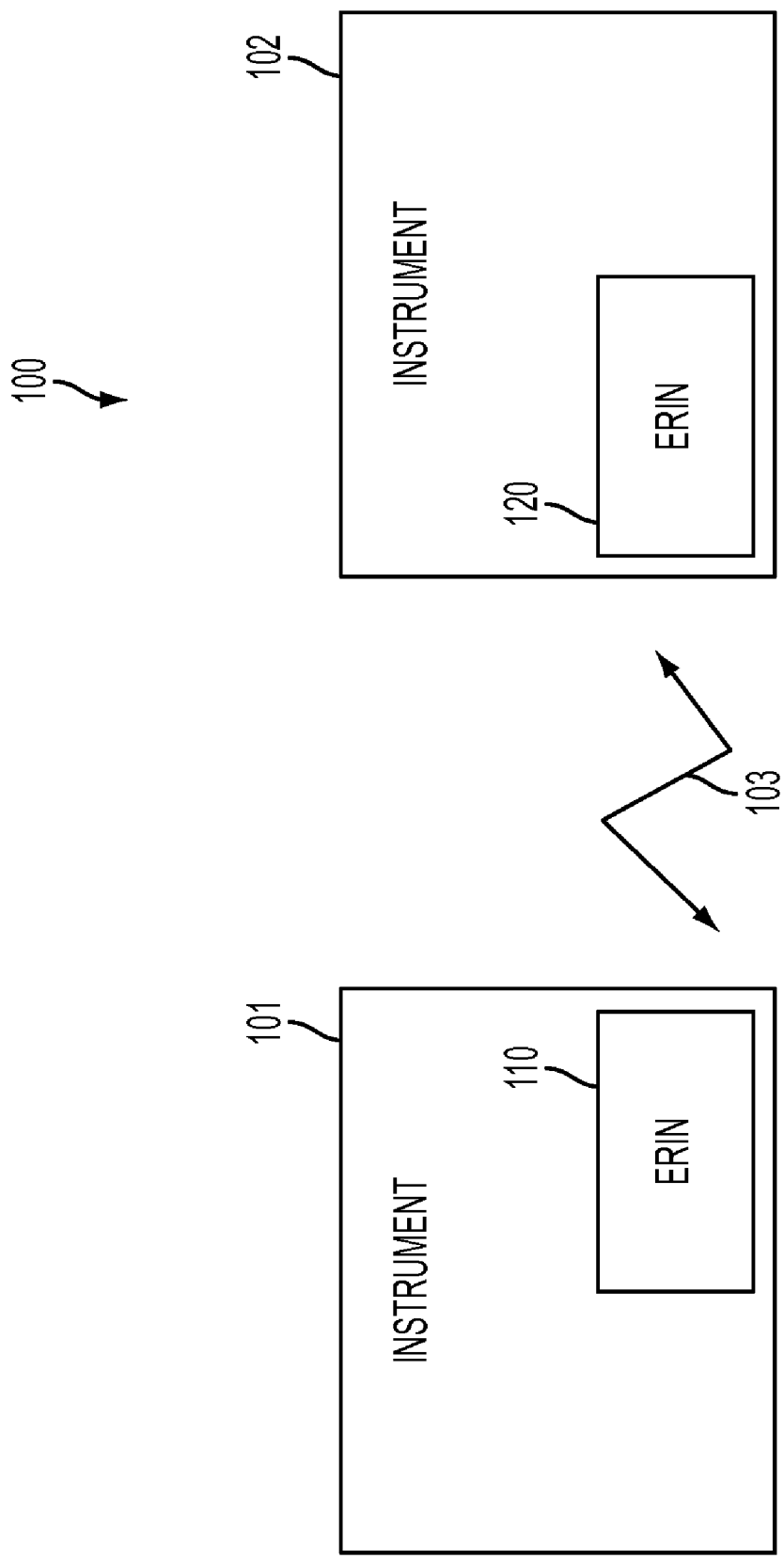
FIG. 1 illustrates an example instrument node array.

The detailed description explains embodiments of the invention, together with advantages and features, by way of example with reference to the drawings.

DETAILED DESCRIPTION OF THE INVENTION

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention are described in detail.

Example embodiments enable measurement of desired features and/or earth science parameters such as soil moisture, water salinity, and snow water equivalent at higher spatial and temporal resolutions in a relatively low time period. A need for deployment of a web of sensors comes from necessity of covering a large area in a relatively short amount of time. Data acquired by different platforms, at different locations but at the same time if put side by side gives a faster form of covering a large area. However, the spatial and temporal resolution, and sensitivity (dynamic range) of the observed phenomenon is still controlled by the limitations of individual sensors. However, example embodiments enable isolated sensors to work together in a coherent way to increase the sensitivity and resolution capability to observe scientific phenomenon.

For example, a microwave sensor such as radar may detect properties of a target by illuminating the target and studying the reflected signal from the target. The spatial resolution obtained with a microwave sensor is governed by the beam width of the antennas used. However, because of other system constraints (weight, size) one can not use largest possible size antenna to have very narrow beam width to achieve fine resolution. In such situations, two sensors separated by a distance with smaller size antennas are used. The smaller size antennas produce wider beam width resulting in relatively poor spatial resolution. However, if two sensors working in coherence are employed they will result in a beam width which is not related to individual antennas but inversely proportional to the separation between the two sensors. Example embodiments enable these two sensors to act in coherence with each other.

According to example embodiments, an Expandable Reconfigurable Instrument Node (ERIN) is provided as a building block for a Web Sensor Strand (WSS). Example embodiments enable isolated sensors in a given web of sensors to behave as a single dynamically adaptive observing sensor by enabling the sensors to act in coherence with each other. Example embodiments allow each sensor node to know the relative position of other sensor nodes and have short-range communications ability with others to share data.

With regards to coherence operation of nodes in a web of sensors, two L-band scatterometers (active radars) are considered as two nodes of a large web of sensors. Using a wireless communication channel between these two widely separated nodes and using a Phase Lock Loop (PLL) technique, example embodiments phase lock the transmitters in these two nodes for their coherent operation.

Turning to FIG. 1, an example instrument node array is illustrated. The instrument node array 100 includes a plurality of instrument nodes (101-102). It is noted that two instrument nodes are illustrated for clarity; however any number of nodes may be included in any particular implementation.

As illustrated, each instrument node 101-102 includes an expandable, reconfigurable instrument node (ERIN; (110, 120). Each ERIN may be a node configured and disposed to enable communication between nodes of an instrument node array. Furthermore, each instrument node 101-102 may include L-Band radar as a sensing means. Other forms of sensing means may be utilized. For example, microwave, sonar, etc. Thus, although the L-Band radar is discussed herein as an example, it is understood that any feature detection means may be used. Furthermore, according to some example embodiments, a global positioning system (GPS) may be implemented in each instrument node 101-102 such that each node may acquire position information.

In the instrument node array 100 illustrated, the node 101 may be configured as a master node while the node 102 may be configured as a slave node. The L-band radar of the two independent sensor nodes radiate electromagnetic energy non-coherently. As described above, one of the radars is treated as a master node 101 and equipped with a single tone transmitter configured to transmit a reference signal. The single tone received by the slave node 102 is used as a reference signal to phase locks the transmitter of the slave node. Positional information acquired through GPS of each node 101-102 is used to apply phase delay correction to the reference signal.

Figure 2:
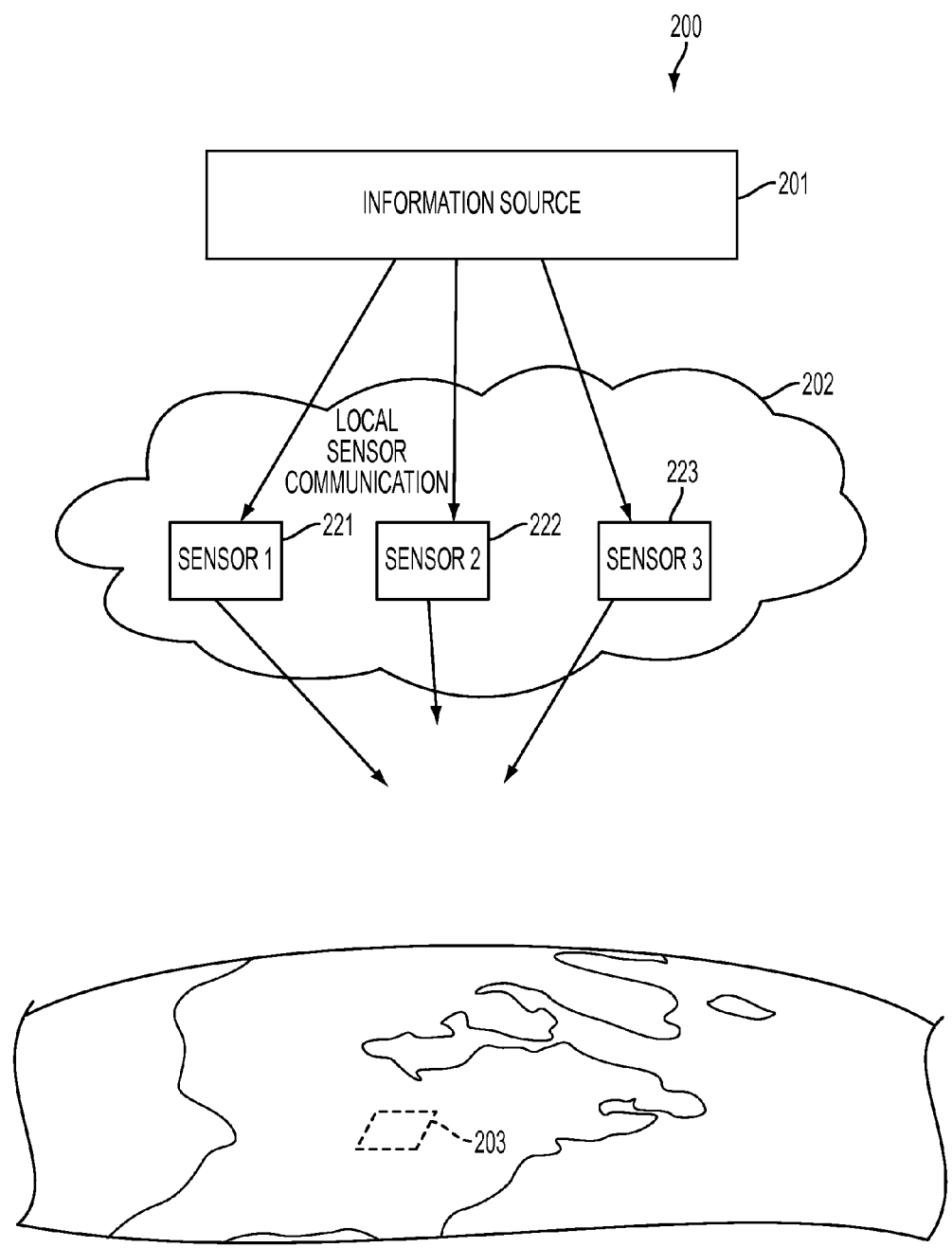
FIG. 2 illustrates an example instrument node array.

Hereinafter, an example implementation of an instrument node array is discussed in detail with reference to FIG. 2.

As illustrated, a system 200 is implemented which includes a local data source 201, and instrument node array 202, and a sensed feature 203.

The local data source 201 may be a computer apparatus configured and disposed to communicate with the instrument node array 202. For example, a wireless communication channel (WiFi, WAN. GPRS, Wireless RS232, etc) may be established between individual nodes of the instrument node array 202 and the local data source 201. Therefore, information may be freely transmitted to and from the local data source and to and from each individual sensor of the instrument node array. As each individual node transmits sensed information, for example as portions of a strand of an image obtained from L-Band radar, the local information source may process the sensed information to produce a desired result.

The instrument node array 202 may include a plurality of sensors 221-223 configured and disposed to sense features of a desired target, for example, feature 203. Each sensor of the plurality of sensors 221-223 may be configured within an instrument node (e.g., 101-102 of FIG. 1) such that positional information exchanged between sensors may be used to decrease the minimal size of features detected thereby increasing a resolution of the desired output. It follows that as each sensor 221-223 is configured for both local communication and communication to the information source 201, a web sensor strand is established.

Furthermore, each sensor of the plurality of sensors 221-223 may be deployed in any fashion. For example, each sensor may be mounted on a vehicle such as, for example, an unmanned aerial vehicle (UAV), airplane, satellite, marine vehicle, or other suitable vehicle. Additionally, each sensor may be deployed on a fixed or portable apparatus or structure such as a handheld apparatus, a tower, a boon, or other suitable apparatus and/or structure. Moreover, sensors may be mounted on a plurality of vehicles, fixed and/or portable apparatuses, and structures.

Hereinafter, a more detailed discussion of individual sensors of individual instrument nodes is described in detail.

Figure 3:
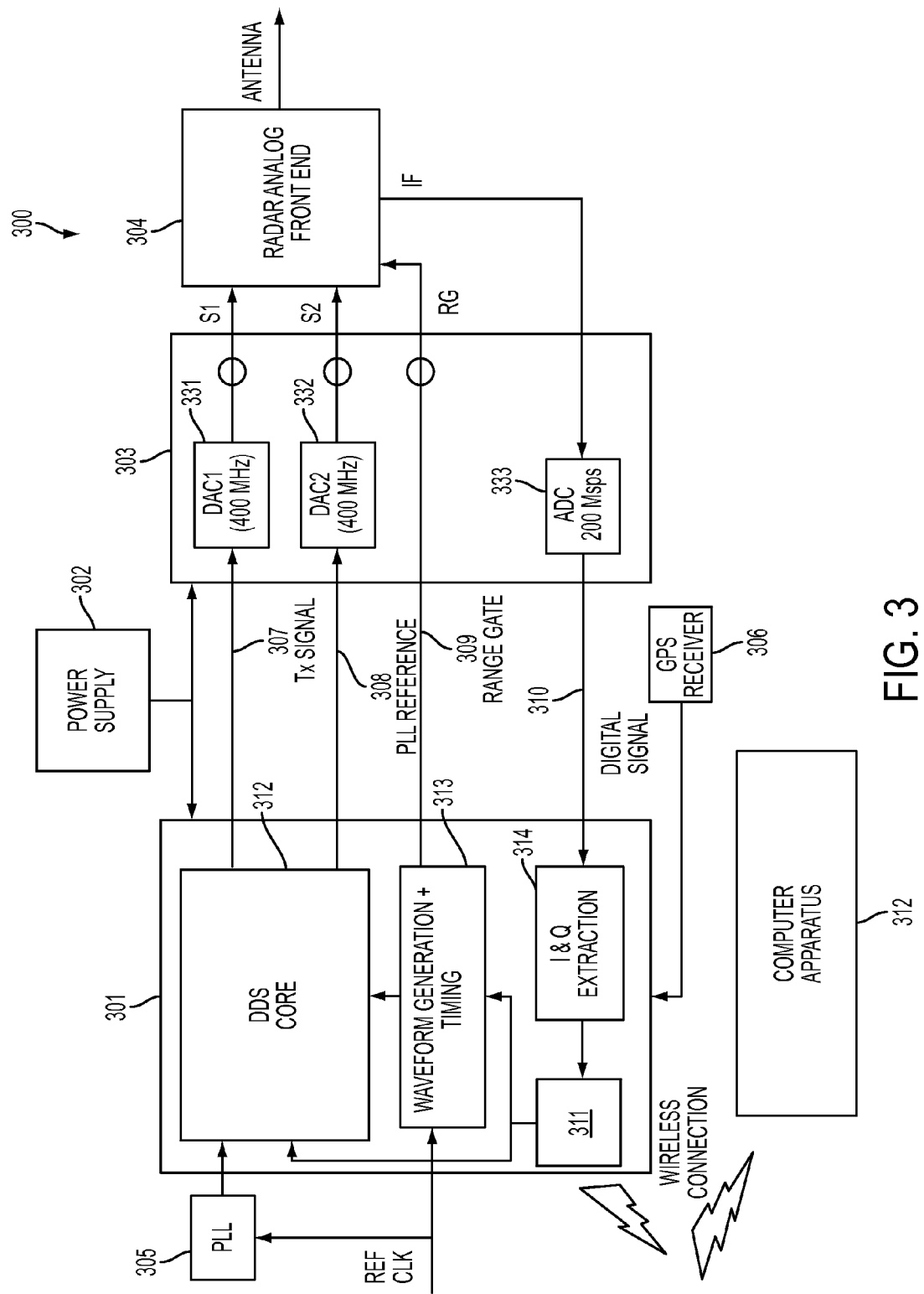
FIG. 3 illustrates an example L-Band radar of an instrument node.

FIG. 3 illustrates an example L-Band radar of an instrument node. The L-Band radar 300 includes a field programmable gate array 301, a power supply 302, a conversion portion 303, a radar front end 304, a phase lock loop portion 305, and a GPS receiver 306.

The field programmable gate array (FPGA) 301 may include a plurality of pre-configured and reconfigurable portions for processing and communications operations. For example, a Direct Digital Synthesis (DDS) Unit Core 312 may be employed in the FPGA for synthesis of signal information received from the radar front end 304. Using signals received from the phase lock loop (PLL) portion 305, a waveform generation portion 313, and in-phase and quadrature-phase data from extraction portion 314, a waveform may be synthesized based on the received information. Furthermore, the FPGA 301 may transmit any produced information over a wireless link 311 to a computer apparatus 312 for further signal/image processing to produce a desired result.

The power supply 302 may be any adequate power supply. According to example embodiments, the power supply 302 may be a voltage source such as a rechargeable battery, solar cell, or other suitable voltage source. Therefore, the L-Band radar 300 may be deployed on portable apparatuses and/or vehicles. In other example embodiments, a direct power source may be used. Thus, example embodiments should not be limited to batteries or portable sources only, as external or fixed power sources may also be used according to any desired implementation.

The conversion portion 303 may be a portion configured and disposed to convert analog information received from the radar front end 304 into digital information to be processed by the FPGA 301 using digital to analog converters 331-332 and analog-to-digital converter 333. Transmit signals 307, PLL reference signals 308, range information 309, and digital output 310 of the radar front end may be exchanged with the FPGA 301. The information exchanged may be used to produce digitized information corresponding to sensed features, which may further be transmitted to a computer apparatus for further processing. In this manner, the L-Band radar 300 may act as a sensor of a web sensor strand, providing information to a local data source as described above.

Figure 4:
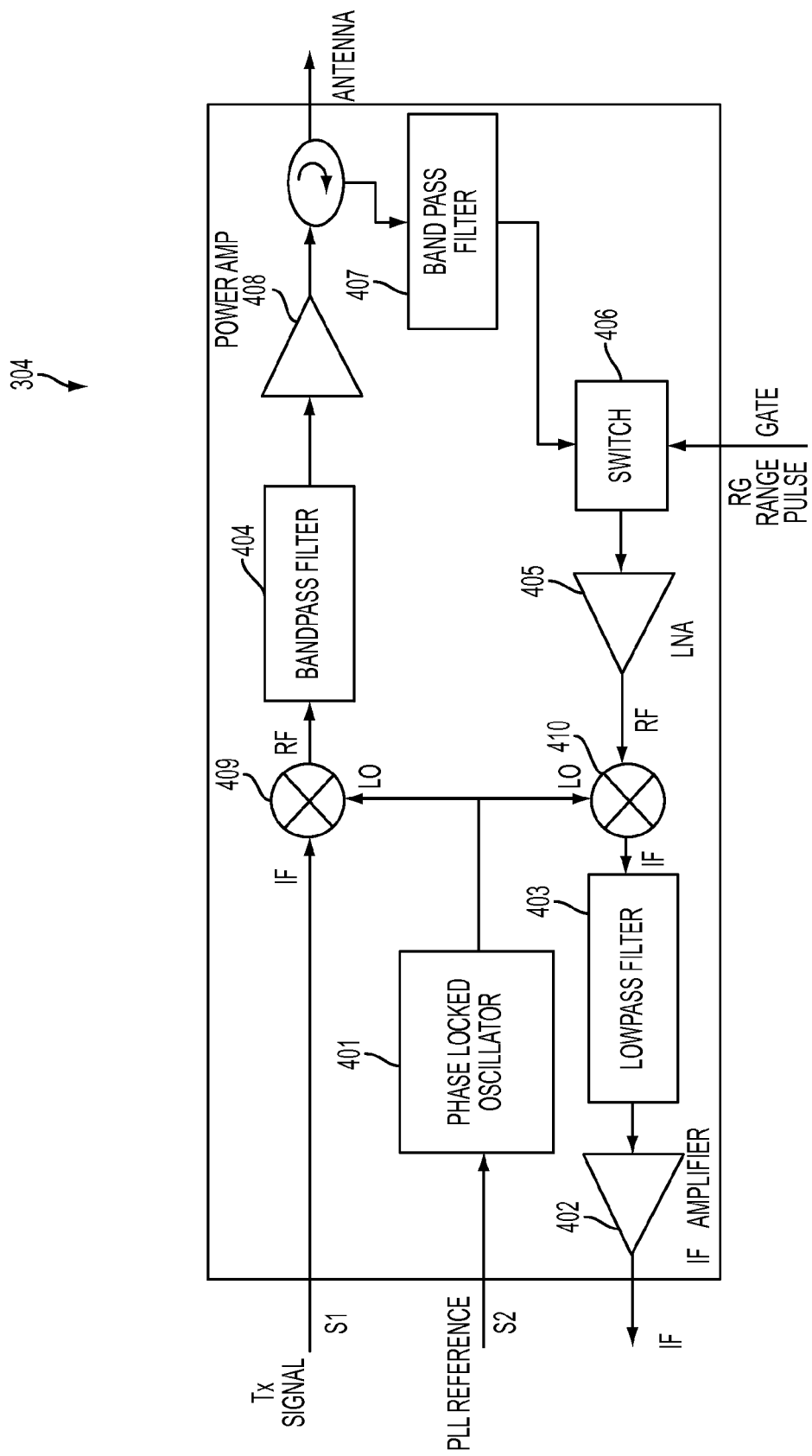
FIG. 4 illustrates a front end of an example L-Band radar of an instrument node.

Hereinafter, the front end 304 of the L-Band radar 300 is described in detail. FIG. 4 illustrates the front end of an example L-Band radar of an instrument node. The radar front end 304 may include a PLL Oscillator 401 configured to sync with another L-Band radar sensor through use of a PLL reference signal S2.

The radar front end 304 may receive the transmit signal S1 and mix said signal with the PLL signal through mixer 409. The front end 304 may further include a bandpass filter 404 coupled to a power amplifier 408 in communication with the radar antenna of the radar front end 304 receiving the mixed signal. Thus radar information received from the radar antennae may be filtered (407), switched (406), mixed with the PLL through mixer 410, and transmitted to the FPGA as a Pulsed-IF radar signal (IF; see FIG. 3). A low noise amplifier 405 and addition filtering (403) and amplification (402) may be performed before transmission to an analog-to-digital converter in communication with the FPGA.

Hereinafter a more detailed example of individual instrument nodes and communications there-between is provided with reference to FIG. 5.

Figure 5:
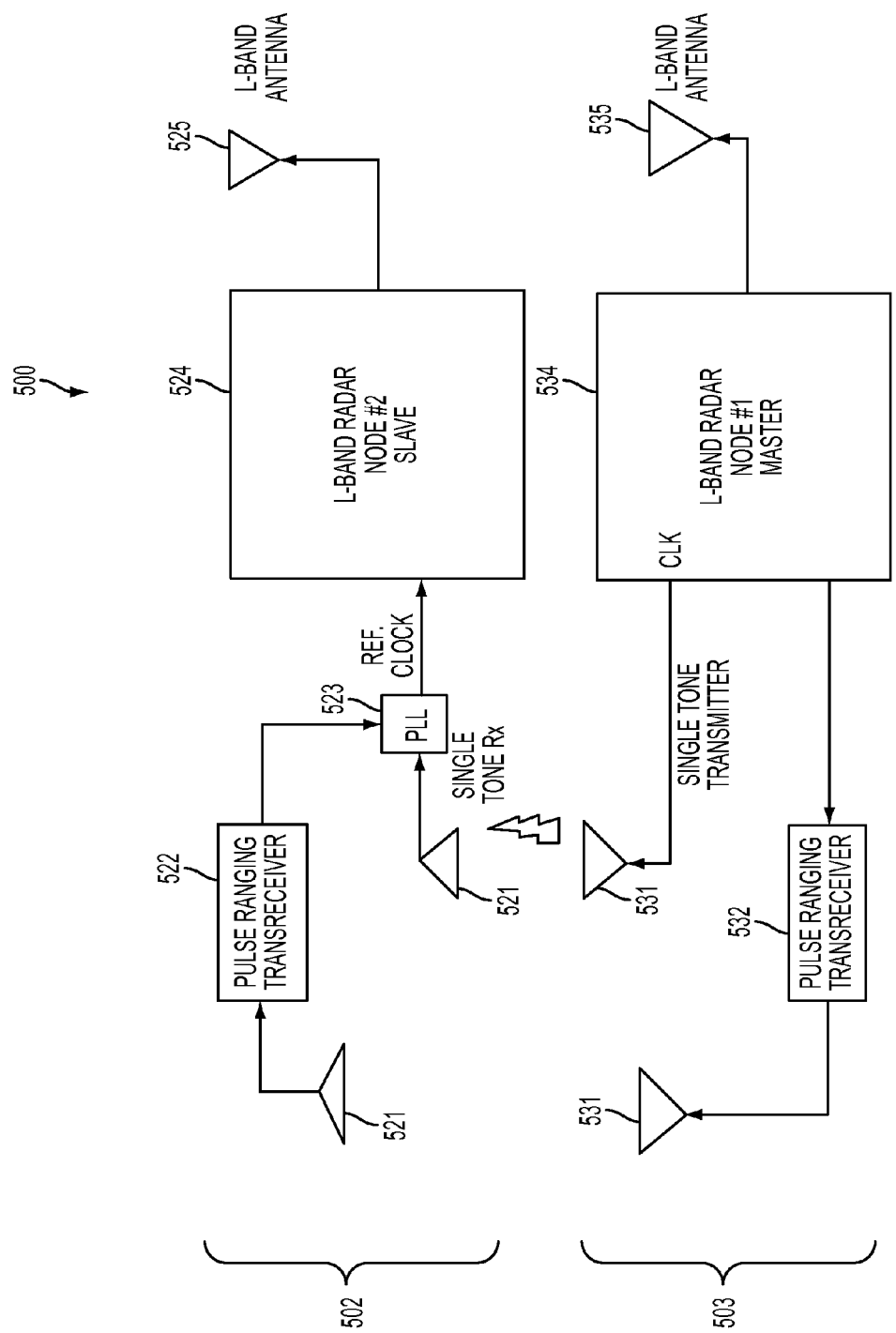
FIG. 5 illustrates an example instrument node array.

FIG. 5 illustrates an example instrument node array 500. The instrument node array may include at least two sensors 502-503. Each sensor 502-503 may include a L-Band radar, single tone transmitter/receiver, pulse transceiver, and GPS receiver.

For example, the sensor 502 may include a low frequency antenna 521 in communication with a pulse ranging transceiver 522. The pulse ranging transceiver 522 may utilize the antenna 521 to establish communications with a pulse ranging transceiver 532 of the sensor 503, over a low frequency antenna 531 of the sensor 503. Using this established communication, ranging information can be exchanged between the sensors 502-503 to increase resolution of acquired and processed radar information.

The sensor 502 may further include a PLL 523 in communication with the pulse ranging transceiver 522. The PLL 522 may be in communication with a low frequency antenna 521. Using the antenna 521, the PLL may receive a single tone transmitted from the sensor 503. Through use of the range information and single tone, phase correction may be applied thereby locking a local oscillator of the sensor 502 and sensor 503.

The sensor 502 may further include L-Band radar 524 configured and disposed to sense desired information pertaining to a feature to be sensed.

The sensor 503 includes somewhat similar components as sensor 502, therefore exhaustive discussion of these components will be omitted herein for the sake of brevity.

As described above, an Expandable Reconfigurable Instrument Node (ERIN) is provided as a building block for a Web Sensor Strand (WSS). Example embodiments enable isolated sensors in a given web of sensors to behave as a single dynamically adaptive observing sensor by enabling the sensors to act in coherence with each other. Example embodiments allow each sensor node to interpret the relative position of other sensor nodes and include short-range communications ability with others to share the data. Using a wireless communication channel between these separated nodes and using the Phase Lock Loop (PLL) technique described above, example embodiments phase lock the transmitters in these nodes and establish their coherent operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An expandable and reconfigurable instrument node, comprising:
 a feature detection means;
 a data processing portion in communication with the feature detection means, the data processing portion configured and disposed to process feature information;

a phase locked loop (PLL) oscillator in communication with the data processing portion, the PLL oscillator configured and disposed to provide PLL information to the processing portion;

a single tone transceiver in communication with the PLL oscillator, the single tone transceiver configured and disposed to transmit or receive a single tone for phase correction of the PLL oscillator;

a pulse transceiver in communication with the PLL oscillator, the pulse transceiver configured and disposed to transmit and receive signals for phase correction of the PLL oscillator; and a global positioning (GPA) receiver in communication with the processing portion, the GPS receiver configured and disposed to establish a global position of the instrument node.

2. The instrument node of claim 1, wherein the feature detection means utilizes electromagnetic waves to detect features.

3. The instrument node of claim 1, wherein the feature detection means is a radar system.

4. The instrument node of claim 1, wherein the feature detection means is a sonar system, an optical system, or a microwave system.

5. The instrument node of claim 1, wherein the processing portion is a field programmable gate array (FPGA).

6. The instrument node of claim 5, wherein the FPGA includes a direct digital synthesis core, a waveform generation and timing portion, and a communications portion.

7. The instrument node of claim 6, wherein the communications portion is disposed and configured to transmit and receive information indicative of detected features.

8. The instrument node of claim 1, wherein the single tone transceiver is configured and disposed to transmit or receive the single tone to or from a second instrument node.

9. The instrument node of claim 8, wherein the transmitted or received single tone is indicative of a phase difference between features sensed at the instrument node and the second instrument node.

10. The instrument node of claim 8, wherein the instrument node is configured as a master node and the second instrument node is configured as a slave node.

11. An instrument node array, comprising:
a first instrument node; and
a second instrument node; wherein,
the first and second instrument nodes each include:
a feature detection means;
a data processing portion in communication with the feature detection means, the data processing portion configured and disposed to process feature information;
a phase locked loop (PLL) oscillator in communication with the data processing portion, the PLL oscillator configured and disposed to provide PLL information to the processing portion;
a single tone transceiver in communication with the PLL oscillator, the single tone transceiver configured and disposed to transmit or receive a single tone for phase correction of the PLL oscillator;
a pulse transceiver in communication with the PLL oscillator, the pulse transceiver configured and disposed to transmit and receive signals for phase correction of the PLL oscillator; and
a global positioning (GPA) receiver in communication with the processing portion, the GPS receiver configured and disposed to establish a global position of the instrument node.

12. The instrument node array of claim 11, wherein the feature detection means of each instrument node utilizes electromagnetic waves to detect features.

13. The instrument node array of claim 11, wherein the feature detection means of each instrument node is a radar system.

14. The instrument node array of claim 11, wherein the feature detection means of each instrument node is a sonar system, an optical system, or a microwave system.

15. The instrument node array of claim 11, wherein the processing portion of each instrument node is a field programmable gate array (FPGA).

16. The instrument node array of claim 15, wherein the FPGA of each processing portion includes a direct digital synthesis core, a waveform generation and timing portion, and a communications portion.

17. The instrument node array of claim 16, wherein the communications portion of each FPGA is disposed and configured to transmit and receive information indicative of detected features.

18. The instrument node array of claim 11, wherein the single tone transceiver of the first instrument node is configured and disposed to transmit or receive the single tone to or from the second instrument node.

19. The instrument node array of claim 18, wherein the transmitted or received single tone is indicative of a phase difference between features sensed at the first instrument node and the second instrument node.

20. A mobile instrument node array, comprising:
a vehicle;
a first instrument node arranged on the vehicle; and
a second instrument node arranged on the vehicle separated from the first instrument node; wherein,
the first instrument node is configured as a master node and the second instrument node is configured as a slave node; and
the first and second instrument nodes each include:
a feature detection means;
a data processing portion in communication with the feature detection means, the data processing portion configured and disposed to process feature information;
a phase locked loop (PLL) oscillator in communication with the data processing portion, the PLL oscillator configured and disposed to provide PLL information to the processing portion;
a single tone transceiver in communication with the PLL oscillator, the single tone transceiver configured and disposed to transmit or receive a single tone for phase correction of the PLL oscillator;
a pulse transceiver in communication with the PLL oscillator, the pulse transceiver configured and disposed to transmit and receive signals for phase correction of the PLL oscillator; and
a global positioning (GPA) receiver in communication with the processing portion, the GPS receiver configured and disposed to establish a global position of the instrument node.

* * * * *